United States Patent
Rondon et al.

(10) Patent No.: US 9,605,150 B2
(45) Date of Patent: *Mar. 28, 2017

(54) RECORDING MEDIA AND RELATED METHODS

(75) Inventors: Sonia Rondon, Nashua, NH (US); Kevin Ray, Windham, NH (US)

(73) Assignee: PRESSTEK, LLC., Hudson, NH (US)

( * ) Notice: Subject to any disclaimer, the term of this patent is extended or adjusted under 35 U.S.C. 154(b) by 800 days.

This patent is subject to a terminal disclaimer.

(21) Appl. No.: 12/970,208

(22) Filed: Dec. 16, 2010

(65) Prior Publication Data

US 2012/0156624 A1    Jun. 21, 2012

(51) Int. Cl.
| | |
|---|---|
| G03F 7/00 | (2006.01) |
| C08L 83/04 | (2006.01) |
| B41C 1/10 | (2006.01) |
| B41N 1/00 | (2006.01) |
| C09D 183/04 | (2006.01) |
| C08G 77/12 | (2006.01) |
| C08G 77/20 | (2006.01) |

(52) U.S. Cl.
CPC ............ *C08L 83/04* (2013.01); *B41C 1/1016* (2013.01); *B41N 1/003* (2013.01); *C09D 183/04* (2013.01); *B41C 2201/02* (2013.01); *B41C 2201/14* (2013.01); *B41C 2210/04* (2013.01); *B41C 2210/08* (2013.01); *B41C 2210/14* (2013.01); *B41C 2210/16* (2016.11); *B41C 2210/24* (2013.01); *B41C 2210/262* (2013.01); *C08G 77/12* (2013.01); *C08G 77/20* (2013.01); *Y10T 428/269* (2015.01); *Y10T 428/31663* (2015.04)

(58) Field of Classification Search
USPC ...................... 430/270.1; 101/463.1
See application file for complete search history.

(56) References Cited

U.S. PATENT DOCUMENTS 5,165,345 A * 11/1992 Lewis et al. .................. 101/453
5,188,032 A    2/1993 Lewis et al.
(Continued)

FOREIGN PATENT DOCUMENTS

EP    0282927    * 9/1988

OTHER PUBLICATIONS

International Search Report mailed Jul. 27, 2012 for International Application No. PCT/US2011/064836 (3 pages).

*Primary Examiner* — Chanceity Robinson
(74) *Attorney, Agent, or Firm* — Morgan, Lewis & Bockius LLP

(57) ABSTRACT

A recording medium comprises an oleophilic substrate and, thereover, a topmost oleophobic layer comprising a cured polymeric silicone matrix that consists essentially of the addition-cure reaction product of a vinyl-functional polydialkylsiloxane and a silane cross-linking agent. The vinyl-functional polydialkylsiloxane has a molecular weight ranging from 30,000 to 75,000 or 110,000 to 130,000. If the molecular weight of the vinyl-functional polydialkylsiloxane is within the range of 30,000 to 75,000, the molar ratio of silane groups to vinyl groups is within the range of about 11:1 to about 25:1; and if the molecular weight of the vinyl-functional polydialkylsiloxane is within the range of 110,000 to 130,000, the molar ratio of silane groups to vinyl groups is from about 5:1 to about 27:1. The recording medium may be used as a lithographic printing plate.

8 Claims, 3 Drawing Sheets

(56) References Cited

U.S. PATENT DOCUMENTS

| | | | |
|---|---|---|---|
| 5,212,048 A * | 5/1993 | Lewis et al. | 430/272.1 |
| 5,310,869 A | 5/1994 | Lewis et al. | |
| 5,339,737 A | 8/1994 | Lewis et al. | |
| 5,487,338 A | 1/1996 | Lewis et al. | |
| RE35,512 E | 5/1997 | Nowak et al. | |
| 6,344,306 B1 * | 2/2002 | Fujiyoshi et al. | 430/272.1 |
| 2002/0146634 A1 | 10/2002 | Hong et al. | |
| 2003/0228540 A1 | 12/2003 | Goto et al. | |
| 2009/0253069 A1 | 10/2009 | Melamed et al. | |
| 2009/0305162 A1 | 12/2009 | Melamed et al. | |
| 2010/0239976 A1 * | 9/2010 | Rondon | 430/270.1 |

* cited by examiner

RECORDING MEDIA AND RELATED METHODS

FIELD OF THE INVENTION

The present invention relates to lithographic printing, and in particular to waterless plate constructions imageable by ablative discharge.

BACKGROUND OF THE INVENTION

Polyorganosiloxane compounds, or "silicones," can be synthesized in a wide variety of forms, and are utilized in numerous commercial applications. Silicone compounds are based on the repeating diorganosiloxane unit ($—R_2SiO—$)$_n$, where R is an organic radical and n denotes the number of units in the polymer chain. Each end of the linear chain is terminated with a functional or non-functional end group; the chain may also be "branched" so as to deviate from a strictly linear structure.

The physical properties of a particular silicone formulation depend on the length of the polymer chain, the nature of the organic functional groups bonded to the silicon atoms, and the terminal groups (more precisely, the alpha and omega groups) at each end of the chain. For example, the most common silicone compounds are based on the polydimethylsiloxane unit, $—Si(CH_3)_2O—$, which, due to the relatively small organic content of the chains, have a limited range of compatibility with organic compounds. By contrast, silicones containing aryl functional groups tend to exhibit properties more commonly associated with organic materials, and such silicones are generally miscible with a broader range of such materials.

Curing can be accomplished in a number of ways, but generally depends on the presence of reactive functional groups on the polymer chains that interact and bond with one another. In "condensation cure" reactions, a small molecule is eliminated when the two functional groups are joined. Typical condensation-cure reactions in silicone chemistry involve combination of silanol ($—SiOH$) functional groups with other such groups to produce an oxygen linkage with the elimination of water. "Addition cure" reactions result in no loss of species, and can involve, for example, hydrosilylation reactions between olefinic functional groups (such as vinyl) and hydrosiloxane groups (which have a silicon hydride moiety).

Variations on the traditional condensation-cure reaction include the "moisture-cure" approach, in which a precursor functional group is first hydrolyzed to form a reactive hydroxyl-bearing group, which then combines with a silanol group as discussed above. Suitable precursor compounds include acetoxy, alkoxy and ketoxime functional silanes, which form acid, alcohol and ketoxime byproducts, respectively, upon hydrolysis. Silanol-functional silicones and mixtures of silanol-functional silicones with silicones containing acetoxy, alkoxy or ketoxime groups are relatively stable so long as moisture is excluded; this is particularly true for silicone polymers having appreciable molecular weights. Obtaining useful reaction rates generally requires a catalyst such as a metal carboxylate compound.

Silanol groups also react with hydrosiloxane species to liberate hydrogen and produce the silicon-oxygen-silicon linkage characteristic of the condensation cures. Use of a metal salt catalyst (such as dibutyltindiacetate) is generally necessary to achieve useful reaction rates. Because it proceeds rapidly when catalyzed, this reaction is widely used for silicone coating formulations applied on a coating line to a web substrate.

Silicone rubber coatings have been adopted by some manufacturers of planographic printing plates. Planographic printing, as contrasted with letter-press and gravure printing, relies on plate constructions in which image and non-image areas lie substantially in the same plane. The plate is prepared by altering the affinities of different areas of the plate for ink. Depending on the type of plate imaging system employed, non-image plate areas become (or remain) oleophobic, or ink-repellent during printing, while image areas remain (or become) oleophilic, or ink-accepting. Ink applied to the plate surface (e.g., by a roller) will adhere to the oleophilic image areas but not the oleophobic non-image areas. The inked plate is then applied to the recording medium (in direct printing) or to an intermediate "blanket" cylinder which then transfers the image to the recording medium (in offset printing).

Manufacturers of planographic printing plates often employ silicone rubber compositions as plate coatings due to their low surface energies, which render them oleophobic and therefore suitable for "dry" or "waterless" plates. In contrast to the traditional "wet" plate, which requires application of a fountain or dampening solution to the plate prior to inking in order to prevent ink from adhering to and transferring from non-image areas, the non-image material of waterless plates is itself sufficiently ink-repellent that no fountain solution is necessary.

Silicone compositions used as coatings for planographic printing plates typically include two basic constituents: a primary polyorganosiloxane base-polymer component and a smaller cross-linking component. The base component is usually a linear, predominantly polydimethylsiloxane copolymer or terpolymer containing unsaturated groups (e.g., vinyl) or silanol groups as reactive centers for bonding with the cross-linking molecules. These groups are commonly situated at the chain termini, although it is possible to utilize a copolymer incorporating the reactive groups within the chain, or branched structures terminating with the reactive groups. It is also possible to combine linear difunctional polymers with copolymers and/or branch polymers.

The cross-linking component is generally a multifunctional, monomeric or oligomeric compound of low molecular weight, which is reacted with the first component to create connections among the chains thereof. The curing reaction generally requires some type of catalyst, either chemical or physical, to produce favorable kinetics. Platinum metal complexes (such as chloroplatinic acid) are often employed to facilitate addition cures, while metal salt catalysts (such as a dialkyltindicarboxylate) are frequently used in conjunction with condensation cures.

If the functional groups of the cross-linking component are situated at the chain termini, cross-linking molecules will form bridges among the base-polymer molecules (particularly if the latter have functional groups distributed along the chains). On the other hand, if the cross-linking component contains functional groups distributed along its length, each molecule will form numerous points of attachment with the base-polymer molecules. Typically, this type of cross-linking molecule is combined with base polymers having chain-terminal functional groups in order to maximize the number of different base-polymer molecules attached to each cross-linking chain.

In addition-cure systems, the hydrosilylation reaction provides fast-curing silicones that can be tailored to display strong bonding to hydroxyl-rich surfaces such as metal substrates. Silicone coating properties such as mechanical and adhesion performance depend on the extent of cross-linking and, therefore, the molar ratio of crosslinker to vinyl functional groups. The addition-curing chemistry involves at least three curing reactions indicated below at (1), (3) and (4). The primary reaction, (1), occurs between a vinyl-functional silicone polymer and a silicon-hydride (—SiH) functional group in the presence of a heavy metal catalyst compound, usually platinum or rhodium. Slower secondary reactions may occur, especially when silicones are formulated with an excess of crosslinker: the first of these is the catalyzed hydrolysis of silicon hydride groups to form —SiOH (reaction (2)). The newly formed silanol groups catalytically react with remaining —Si—H groups to form —Si—O—Si— bonds (reaction (3)). Finally, in the slowest condensation reaction, two silanol groups form an —Si—O—Si— linkage (reaction (4)). Reaction (1) is referred to as the "crosslinking" or "cure" reaction while reactions (2) through (4) are "post-cure" reactions.

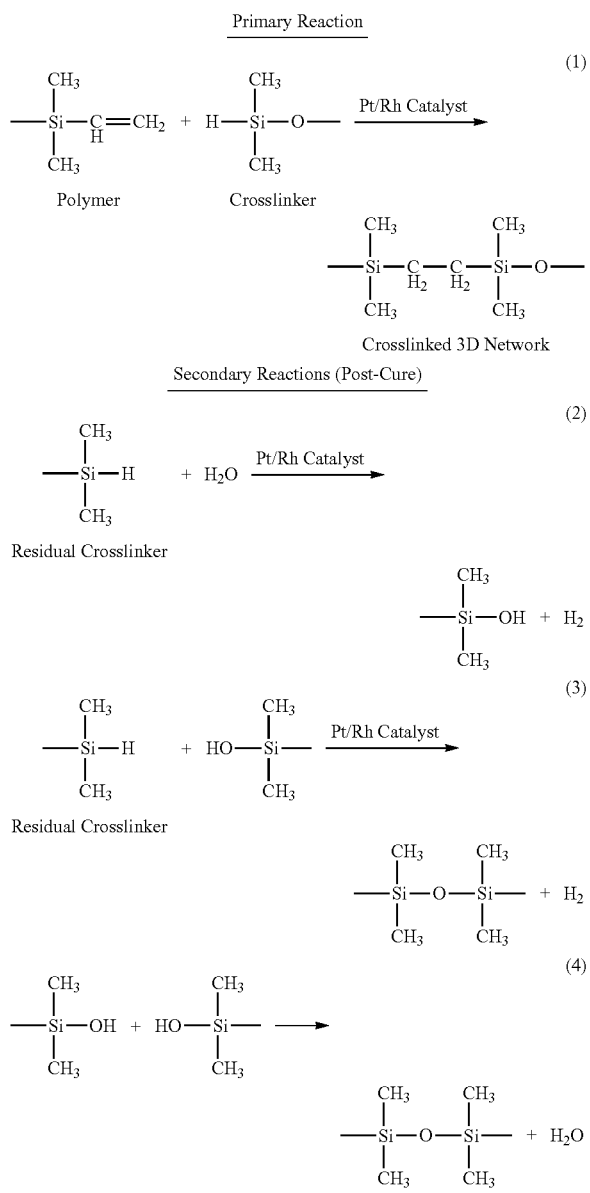

When preparing silicone printing plates, the presence of a substrate interface increases the possibility of competing side-reactions. It is known that crosslinker silicon hydride groups and hydrolyzed silanol groups may react with substrate-borne hydroxyl groups. Silicone molecules attach to a substrate via two mechanisms: mechanical interlocking and chemical reaction. Mechanical interlocking occurs when silicone is applied to semi-porous substrates such as paper, but it cannot account exclusively for long-term stable anchorage of silicones to metal and polymer surfaces. The strength of silicone bonding depends mainly on chemical interactions between the silicone and a substrate. Metal surfaces exposed to air (or passivated metal) contain hydroxyl groups that interact with silicon hydride and silanol moieties forming a silyl ether linkage. FIG. 1 suggests a mechanism for the adhesion of silicone to metal substrates. These side reactions account for long-term adhesion of silicone to metal substrates, and illustrate the importance of using a large excess of crosslinker when coating addition-cured silicones on metals. Similarly, the adhesion of silicone to a polymer surface occurs when silicone crosslinker reacts not only with unreacted surface hydroxyls but also with available carboxyl groups.

A silicone coating composition is applied to a plate substrate using any of a variety of well-known coating techniques. The choice of technique is critical not only to the ultimate performance of the plate, but also to the efficiency and reliability of the overall platemaking process. Typical coating techniques include roll coating, reverse-roll coating, gravure coating, offset-gravure coating, slot coating, and wire-wound rod coating. The coating procedure must be rapid enough to achieve a satisfactory production rate, yet produce a highly uniform, smooth, level coating on the plate. Even small deviations in coating uniformity can adversely affect plate performance, since the planographic printing process depends strongly on coplanarity of image and non-image areas; in other words, the printing pattern reproduced by the plate must reflect the configuration of oleophilic and oleophobic areas impressed thereon, and remain uninfluenced by topological characteristics of the plate surface.

Blank dry plates are subjected to an imaging process that removes the silicone coating from image areas to reveal an oleophilic surface. Imaging can be accomplished in a number of ways. In traditional photosensitive plates, exposure of a photoresist material in the plate structure to actinic radiation alters the solubility or anchorage properties of the silicone. In typical commercial plates, exposure to light results either in firm anchorage of the silicone coating to the plate (in positive-working plates) or in destruction of the existing anchorage (in negative-working plates). Depending on the process chosen, the plate is first exposed to actinic radiation passing through a positive or negative rendition of the desired image that selectively blocks transmission of the radiation to the plate. After this exposure step, the plate is developed in chemical solvents that either anchor the exposed silicone or remove it to produce the final, imaged plate.

To circumvent the cumbersome photographic development, plate-mounting, and plate-registration operations that typify photoexposure printing technologies, practitioners have developed electronic alternatives that store the "image-wise" pattern in digital form and impress the pattern directly onto the plate. Plate-imaging devices amenable to computer control include various forms of lasers. Current laser-based lithographic systems often rely on removal of an energy-absorbing layer from the lithographic plate to create an image. Exposure to laser radiation may, for example, cause ablation—i.e., catastrophic overheating—of the ablated layer, which de-anchors the silicone and facilitates its removal (along with remnants of the ablated "imaging" layer).

This imaging process and the rigors of commercial printing impart significant stress to the silicone rubber layer of a lithographic printing plate, and indeed, at the coating weights typically employed for economic reasons as well as to promote easy handling, such layers are inherently fragile and prone to scratching. Waterless printing plates fail when the silicone rubber loses ink repellency and non-image areas accept ink. Accordingly, there is a need for silicone coatings with improved robustness, leading to printing plates with enhanced durability and correspondingly longer run lengths.

DESCRIPTION OF THE INVENTION

Brief Summary of the Invention

Although laser-imageable lithographic printing plates using addition-cured silicone top layers are known, it has been found, surprisingly, that the durability of a finished coating depends strongly on certain formulation parameters—in particular, when combining a vinyl-functional polydialkylsiloxane with a silane cross-linking agent, the molecular weight of the vinyl-functional polydialkylsiloxane and the molar ratio of silicon hydride functional groups to vinyl groups are both critical and interrelated. (As used herein, the term "silane cross-linking agent" means a polydialkylhydrosiloxane polymer having multiple (e.g., terminal) silicon hydride functional groups.) Specifically, the vinyl-functional polydialkylsiloxane should have a molecular weight ranging from 30,000 to 75,000 or 110,000 to 130,000. (The molecular weights given herein are weight average molecular weights.) If the molecular weight of the vinyl-functional polydialkylsiloxane is within the former range, the molar ratio of silane groups to vinyl groups should be within the range of about 11:1 to about 25:1; and if the molecular weight of the vinyl-functional polydialkylsiloxane is within the latter range, the molar ratio of silane groups to vinyl groups should be from about 5:1 to about 27:1.

Typically, the silicone layer is formed from an addition cure, hydrosilylation reaction using a platinum catalyst such as elemental platinum, platinum chloride, chloroplatinic acid, olefin coordinated platinum, an alcohol modified complex of platinum, or a methylvinyl polysiloxane complex of platinum. The vinyl-functional polydimethylsiloxane may be vinyl-terminated, and the polymethylhydrosiloxane polymer may be trimethylsiloxy-terminated. The silicone constituents may be applied to a plate precursor in a solvent or solvent mix carrier.

Accordingly, in a first aspect, the invention relates to a recording medium comprising an oleophilic substrate and, thereover, a topmost oleophobic layer comprising a cured polymeric silicone matrix that consists essentially of the addition-cure reaction product of a vinyl-functional polydialkylsiloxane and a silane cross-linking agent. The vinyl-functional polydialkylsiloxane has a molecular weight ranging from 30,000 to 75,000 or 110,000 to 130,000. If the molecular weight of the vinyl-functional polydialkylsiloxane falls within the range of 30,000 to 75,000, the molar ratio of silane groups to vinyl groups falls within the range of about 11:1 to about 25:1; and if the molecular weight of the vinyl-functional polydialkylsiloxane is within the range of 110,000 to 130,000, the molar ratio of silane groups to vinyl groups is from about 5:1 to about 27:1.

In various embodiments, the vinyl-functional polydialkylsiloxane is vinyl-functional polydimethylsiloxane. In one formulation, the vinyl-functional polydialkylsiloxane has a molecular weight ranging from 30,000 to 65,000, while in another formulation, the vinyl-functional polydialkylsiloxane has a molecular weight ranging from 110,000 to 130,000 and the molar ratio of silane groups to vinyl groups is from about 20:1 to 27:1. The silane cross-linking agent may be, for example, a trimethylsiloxy-terminated polymethylhydrosiloxane.

The silicone layer may have a dry coating weight of, for example, 0.5 to 2.5 g/m$^2$, with the range 1 to 2.5 g/m$^2$ being particularly preferred for typical commercial applications. The substrate may be or comprise a polyester film, or a metal sheet having an oleophilic (e.g., polyacrylate) coating thereover, or other suitable constructions presenting an oleophilic surface. In various embodiments, a laser-ablatable imaging layer is disposed between the substrate and the topmost layer. In particular, the imaging layer may be ablatable upon exposure to a laser beam having a fluence of at least 250 mJ/cm$^2$. For example, the imaging layer may be a thin (e.g., 50 nm or thinner) metal/metal oxide layer.

In another aspect, the invention pertains to a method of imaging a lithographic printing member. In various embodiments, the method comprises the steps of, first, providing a printing member comprising an oleophilic substrate, an ablatable imaging layer thereover, and a topmost oleophobic layer comprising a cured polymeric silicone matrix that consists essentially of the addition-cure reaction product of a vinyl-functional polydialkylsiloxane and a silane cross-linking agent. In particular, the vinyl-functional polydialkylsiloxane has a molecular weight ranging from 30,000 to 75,000 or 110,000 to 130,000, and if the molecular weight of the vinyl-functional polydialkylsiloxane is within the range of 30,000 to 75,000, the molar ratio of silane groups to vinyl groups is within the range of about 11:1 to about 25:1; whereas if the molecular weight of the vinyl-functional polydialkylsiloxane is within the range of 110,000 to 130,000, the molar ratio of silane groups to vinyl groups is from about 5:1 to about 27:1. The printing member is exposed to imaging radiation so as to ablate the imaging layer in an imagewise pattern, following which the topmost layer is removed where the printing member received radiation, thereby creating an imagewise lithographic pattern on the printing member.

In still another aspect, the invention relates to a method of forming an imageable lithographic printing member. In various embodiments, the method comprises the steps of applying, to an ink-receptive layer, an imaging layer ablatable by exposure to imaging radiation; and applying, to the imaging layer, a coating composition comprising a vinyl-functional polydialkylsiloxane and a silane cross-linking agent. In particular, the vinyl-functional polydialkylsiloxane has a molecular weight ranging from 30,000 to 75,000 or 110,000 to 130,000, and if the molecular weight of the vinyl-functional polydialkylsiloxane is within the range of 30,000 to 75,000, a molar ratio of silane groups to vinyl groups is within the range of about 11:1 to about 25:1; whereas if the molecular weight of the vinyl-functional polydialkylsiloxane is within the range of 110,000 to 130,000, the molar ratio of silane groups to vinyl groups is from about 5:1 to about 27:1. The coating composition is cured into a silicone matrix, e.g., by an addition cure. The addition cure may be performed with a platinum catalyst.

It should be stressed that, as used herein, the term "plate" or "member" refers to any type of printing member or surface capable of recording an image defined by regions exhibiting differential affinities for ink and/or fountain solution. Suitable configurations include the traditional planar or curved lithographic plates that are mounted on the plate cylinder of a printing press, but can also include seamless cylinders (e.g., the roll surface of a plate cylinder), an endless belt, or other arrangement.

Furthermore, the term "hydrophilic" is used in the printing sense to connote a surface affinity for a fluid which prevents ink from adhering thereto. Such fluids include water for conventional ink systems, aqueous and non-aqueous dampening liquids, and the non-ink phase of single-fluid ink systems. Thus, a hydrophilic surface in accordance herewith exhibits preferential affinity for any of these materials relative to oil-based materials.

"Ablation" of a layer means either rapid phase transformation (e.g., vaporization) or catastrophic thermal overload, resulting in uniform layer decomposition. Typically, decomposition products are primarily gaseous. Optimal ablation involves substantially complete thermal decomposition (or pyrolysis) with limited melting or formation of solid decomposition products.

The terms "substantially" and "about" mean ±10% (e.g., by weight or by volume), and in some embodiments, ±5%. The term "consists essentially of" means excluding other materials that contribute to function. For example, a cured polymeric silicone matrix that consists essentially of the addition-cure reaction product of a vinyl-functional polydialkylsiloxane and a silane cross-linking agent may include modifiers added to alter physical properties, such as adhesion or rheology, of the finished coating; and/or colorants, in the form of dyes or pigments, to facilitate quality-assurance evaluation or monitoring of the imaging process.

BRIEF DESCRIPTION OF THE DRAWINGS

The foregoing discussion will be understood more readily from the following detailed description of the invention when taken in conjunction with the accompanying drawings, in which.

The drawings and elements thereof may not be drawn to scale.

DETAILED DESCRIPTION

1. Lithographic Printing Members

Figure 1:
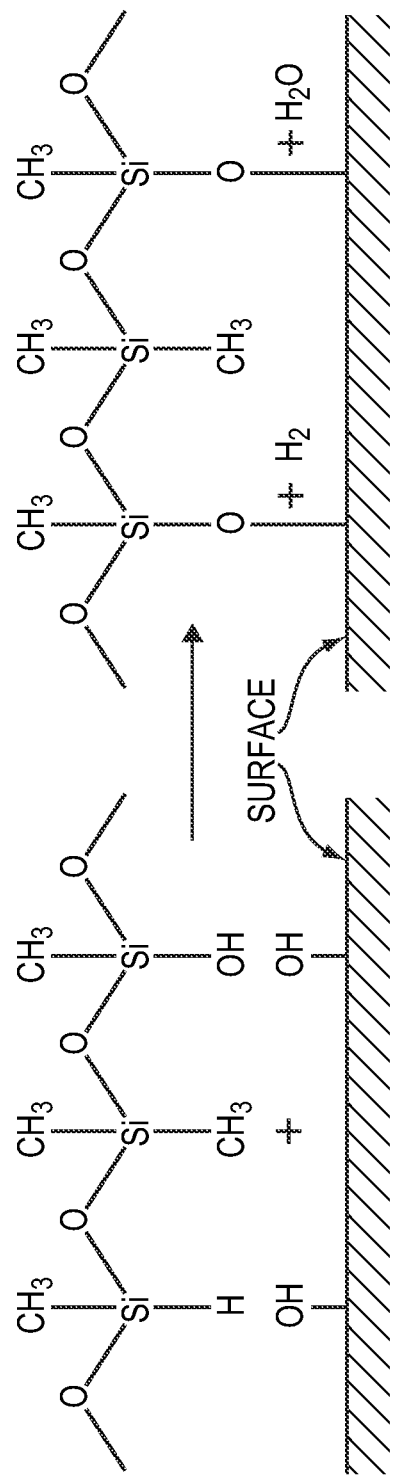
FIG. 1 illustrates an adhesion mechanism between a silicone layer to a metal underlying layer or substrate.
Figure 2A:
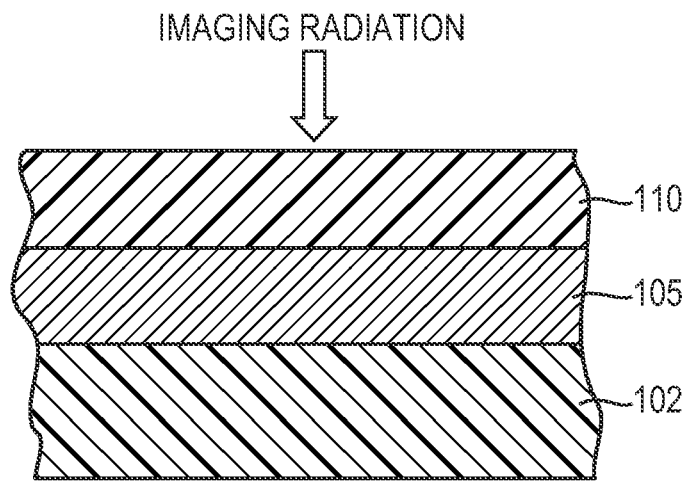
FIGS. 2A-2C are enlarged sectional views of a printing member in accordance with the invention and show the results of imaging the printing member.

FIG. 2A illustrates a negative-working printing member 100 according to the invention that includes a substrate 102, an imaging layer 105, and a topmost layer 110. Layer 105 is sensitive to imaging (generally IR) radiation as discussed below, and imaging of the printing member 100 (by exposure to IR radiation) results in ablation of layer 105. The resulting de-anchorage of topmost layer 110 facilitates its removal by rubbing or simply as a result of contact during the print "make ready" process. The surface of substrate 102 exhibits a lithographic affinity opposite that of topmost layer 110. Consequently, ablation of layer 105, followed by imagewise removal of the topmost layer 110 to reveal an underlying layer or the substrate 102, results in a lithographic image. Most of the films used in the present invention are continuous, meaning that the underlying surface is completely covered with a uniform layer of the deposited material.

Each of these layers and their functions is described in detail below.

a. Topmost Layer 110

The topmost layer participates in printing and provides the requisite lithographic affinity difference with respect to substrate 102. In addition, the topmost layer may help to control the imaging process by modifying the heat dissipation characteristics of the printing member at the air-imaging layer interface. The topmost layer 110 remains bonded to the imaging layer and rejects ink.

In accordance herewith, topmost layer 110 comprises or consists essentially of a cured polymeric silicone matrix that itself consists essentially of the addition-cure reaction product of a vinyl-functional polydialkylsiloxane and a silane cross-linking agent. The vinyl-functional polydialkylsiloxane has a molecular weight ranging from 30,000 to 75,000 or 110,000 to 130,000. If the molecular weight of the vinyl-functional polydialkylsiloxane is within the range of 30,000 to 75,000, the molar ratio of silane groups to vinyl groups is within the range of about 11:1 to about 25:1; and if the molecular weight of the vinyl-functional polydialkylsiloxane is within the range of 110,000 to 130,000, the molar ratio of silane groups to vinyl groups is from about 5:1 to about 27:1.

In various embodiments, and as illustrated in the examples below, the vinyl-functional polydialkylsiloxane is vinyl-functional polydimethylsiloxane. In one implementation, the vinyl-functional polydialkylsiloxane has a molecular weight ranging from 30,000 to 65,000, while in another implementation, the vinyl-functional polydialkylsiloxane has a molecular weight ranging from 110,000 to 130,000 and the molar ratio of silane groups to vinyl groups is from about 20:1 to 27:1. The silane cross-linking agent may be, for example, a trimethylsiloxy-terminated polymethylhydrosiloxane. Layer 110 may have a dry coat weight of, for example, $2 \text{ g/m}^2 \pm 0.2 \text{ g/m}^2$.

b. Imaging Layer 105

The imaging layer 105 can consist of a polymeric system that intrinsically absorbs in the near-IR region, or a polymeric coating into which near-IR-absorbing components (usually near-IR dyes and/or carbon) have been dispersed or dissolved. Alternatively, layer 105 can be a metal layer thin enough to support imaging by absorbing, rather than reflecting, IR radiation. To perform an absorptive function, a metal layer 105 should transmit as much as 70% (and at least 5%) of the IR radiation incident thereon; if transmission is insufficient, the layer will reflect radiation rather than absorbing it, while excessive transmission levels appear to be associated with insufficient absorption.

Imaging layer 105 may, for example, be a thin metal layer having a high extinction coefficient in the imaging wavelength range (e.g., 600-1200 nm). In general, layer 105 is very thin (e.g., no thicker than 50 nm) so as to be ablatable upon exposure to a laser beam having a fluence of at least 250 $\text{mJ/cm}^2$. A metal layer may be applied using physical vapor deposition methods (PVD) such as magnetron sputtering deposition, thermal evaporation, or laser vapor deposition. A preferred metal is titanium, but alternative metals include alloys of titanium, aluminum, alloys of aluminum, nickel, iron, chromium, and others exhibiting the required optical densities and adequate radiation absorption. Bilayers as described in U.S. Ser. No. 12/405,732, filed on Mar. 17, 2009 (the entire disclosure of which is hereby incorporated by reference) may also be used. Also suitable are polymeric imaging layers, e.g., nitrocellulose materials, polymers such as polyester loaded with radiation-absorptive pigments (such as carbon black), conductive polymers (such as the ICP-117 polypyrrole-based conductive material supplied by Polaroid Corp. Commercial Chemicals, Assonet, Mass., or Americhem Green #34384-C3, a proprietary polyaniline-based conductive coating supplied by Americhem, Inc., Cuyahoga Falls, Ohio), or polymers containing nigrosine in particulate or solubilized form. See, e.g., U.S. Pat. No. 5,704,291 (the entire disclosure of which is hereby incorporated by reference).

More generally, in polymeric embodiments, layer 105 can be any polymer capable of stably retaining, at the applied thickness, an IR-absorptive pigment dispersion (generally nonconductive carbon black) adequate to cause ablation of the layer in response to an imaging pulse. Layer 105 should exhibit good adhesion to the overlying layer 110, and resistance to age-related degradation may also be considered. In general, pigment loading levels are at least 25 wt %, and the coating is applied at a dry weight of at least $0.2 \text{ g/m}^2$, or at least $0.4 \text{ g/m}^2$, or at least $0.8 \text{ g/m}^2$, or at least $1.0 \text{ g/m}^2$, or in some embodiments, at least $1.5 \text{ g/m}^2$. Representative materials include BAKELITE (phenol formaldehyde) and other phenolic resins, vinyl chloride resins, acrylic resins, and/or polyvinyl butyral. Other suitable materials include polymers formed from maleic anhydride and one or more styrenic monomers (that is, styrene and styrene derivatives having various substituents on the benzene ring), polymers formed from methyl methacrylate and one or more carboxy-containing monomers, and mixtures thereof. These polymers can comprise recurring units derived from the noted monomers as well as recurring units derived from additional, but optional, monomers (e.g., (meth)acrylates, (meth)acrylonitrile and (meth)acrylamides). The carboxy-containing recurring units can be derived, for example, from acrylic acid, methacrylic acid, itaconic acid, maleic acid, and similar monomers known in the art. Other suitable materials include polymer binders having pendant epoxy groups. Particularly useful polymers of this type have pendant epoxy groups attached to the polymer backbone through a carboxylic acid ester group such as a substituted or unsubstituted —C(O)O-alkylene, —C(O)O-alkylene-phenylene-, or —C(O)O-phenylene group wherein the alkylene has 1 to 4 carbon atoms. Preferred ethylenically unsaturated polymerizable monomers having pendant epoxy groups useful to make these polymer binders include glycidyl acrylate, glycidyl methacrylate, 3,4-epoxycyclohexyl methacrylate, and 3,4-epoxycyclohexyl acrylate. The epoxy-containing polymers can also comprise recurring units derived from one or more ethylenically unsaturated polymerizable monomers that do not have pendant epoxy groups including but not limited to, (meth)acrylates, (meth)acrylamides, vinyl ether, vinyl esters, vinyl ketones, olefins, unsaturated imides (such as maleimide), N-vinyl pyrrolidones, N-vinyl carbazole, vinyl pyridines, (meth)acrylonitriles, and styrenic monomers. Of these, the (meth)acrylates, (meth)acrylamides, and styrenic monomers are preferred and the styrenic monomers are most preferred. For example, a styrenic monomer could be used in combination with methacrylamide, acrylonitrile, maleimide, vinyl acetate, or N-vinyl pyrrolidone.

Still other useful materials include polyvinyl acetals, (meth)acrylic resins comprising carboxy groups, vinyl acetate crotonate-vinyl neodecanoate copolymer phenolic resins, maleated wood rosins, styrene-maleic anhydride copolymers, (meth)acrylamide polymers, polymers derived from an N-substituted cyclic imide, and combinations thereof. Particularly useful materials include polyvinyl acetals, and copolymers derived from an N-substituted cyclic imide (especially N-phenylmaleimide), a (meth)acrylamide (especially methacrylamide), and a (meth)acrylic acid (especially methacrylic acid). The preferred polymeric materials of this type are copolymers that comprise from about 20 to about 75 mol % and preferably about 35 to about 60 mol % of recurring units derived from N-phenylmaleimide, N-cyclohexylmaleimide, N-benzylmaleimide, or a mixture thereof; from about 10 to about 50 mol % and preferably from about 15 to about 40 mol % of recurring units derived from acrylamide, methacrylamide, or a mixture thereof; and from about 5 to about 30 mol % and preferably about 10 to about 30 mol % of recurring units derived from methacrylic acid. Other hydrophilic monomers, such as hydroxyethyl methacrylate, may be used in place of some or all of the methacrylamide. Other alkaline-soluble monomers, such as acrylic acid, may be used in place of some or all of the methacrylic acid.

Further suitable polymeric materials include resins having activated methylol and/or activated alkylated methylol groups. Such resins include, for example, resole resins and their alkylated analogs, methylol melamine resins and their alkylated analogs (e.g., melamine-formaldehyde resins), methylol glycoluril resins and alkylated analogs (e.g., glycoluril-formaldehyde resins), thiourea-formaldehyde resins, guanamine-formaldehyde resins, and benzoguanamine-formaldehyde resins. Commercially available melamine-formaldehyde resins and glycoluril-formaldehyde resins include, for example, CYMEL resins (Dyno Cyanamid) and NIKALAC resins (Sanwa Chemical). The resin having activated methylol and/or activated alkylated methylol groups is preferably a resole resin or a mixture of resole resins. Resole resins are well known to those skilled in the art. They are prepared by reaction of a phenol with an aldehyde under basic conditions using an excess of phenol. Commercially available resole resins include, for example, GP649D99 resole (Georgia Pacific).

c. Substrate 102

The substrate 102 provides dimensionally stable mechanical support to the printing member 100. The substrate 102 should be strong, stable, and flexible. One or more surfaces (and, in some cases, bulk components) of the substrate may be hydrophilic. The topmost surface, however, is generally oleophilic. Suitable materials include, but are not limited to, polymers, metals and paper, but generally, it is preferred to have a polymeric ink-accepting layer (e.g., applied over a metal or paper support). As used herein, the term "substrate" refers generically to the ink-accepting layer beneath the radiation-sensitive layer 105, although the substrate may, in fact, include multiple layers (e.g., an oleophilic film laminated to or coated on a metal support, or an oleophilic coating over a paper support).

Substrate 102 desirably also exhibits high scattering with respect to imaging radiation. This allows full utilization of the radiation transmitted through overlying layers, as the scattering causes back-reflection into layer 105 and consequent increases in thermal efficiency. Polymers suitable for use in substrates according to the invention include, but are not limited to, polyesters (e.g., polyethylene terephthalate and polyethylene naphthalate), polycarbonates, polyurethane, acrylic polymers, polyamide polymers, phenolic polymers, polysulfones, polystyrene, and cellulose acetate. A preferred polymeric substrate is polyethylene terephthalate film, such as the polyester films available from DuPont-Teijin Films (Hopewell, Va.) under the trademarks MYLAR and MELINEX, for example. Also suitable are the white polyester products from DuPont-Teijin such as MELINEX 927W, 928W 329, 329S, 331.

Polymeric substrates can be coated with a hard polymer transition layer to improve the mechanical strength and durability of the substrate and/or to alter the hydrophilicity or oleophilicity of the surface of the substrate. Ultraviolet or electron-beam cured acrylate coatings, for example, are suitable for this purpose. Polymeric substrates can have thicknesses ranging from about 50 µm to about 500 µm or more, depending on the specific printing member application. For printing members in the form of rolls, thicknesses of about 200 µm are preferred. For printing members that include transition layers, polymer substrates having thicknesses of about 50 µm to about 100 µm are preferred.

2. Imaging and Printing

An imaging apparatus suitable for use in conjunction with the present printing members includes at least one laser device that emits in the region of maximum plate responsiveness, i.e., whose $\lambda_{max}$ closely approximates the wavelength region where the imaging layer 105 absorbs most strongly. Specifications for lasers that emit in the near-infrared (IR) region are fully described in U.S. Pat. Nos. Re. 35,512 ("the '512 patent") and 5,385,092 ("the '092 patent"), the entire disclosures of which are hereby incorporated by reference. Lasers emitting in other regions of the electromagnetic spectrum are well-known to those skilled in the art.

Suitable imaging configurations are also set forth in detail in the '512 and '092 patents. Briefly, laser output can be provided directly to the plate surface via lenses or other beam-guiding components, or transmitted to the surface of a blank printing plate from a remotely sited laser using a fiber-optic cable. A controller and associated positioning hardware maintain the beam output at a precise orientation with respect to the plate surface, scan the output over the surface, and activate the laser at positions adjacent selected points or areas of the plate. The controller responds to incoming image signals corresponding to the original document or picture being copied onto the plate to produce a precise negative or positive image of that original. The image signals are stored as a bitmap data file on a computer. Such files may be generated by a raster image processor ("RIP") or other suitable means. For example, a RIP can accept input data in page-description language, which defines all of the features required to be transferred onto the printing plate, or as a combination of page-description language and one or more image data files. The bitmaps are constructed to define the hue of the color as well as screen frequencies and angles.

Other imaging systems, such as those involving light valving and similar arrangements, can also be employed; see, e.g., U.S. Pat. Nos. 4,577,932; 5,517,359; 5,802,034; and 5,861,992, the entire disclosures of which are hereby incorporated by reference. Moreover, it should also be noted that image spots may be applied in an adjacent or in an overlapping fashion.

The imaging apparatus can operate on its own, functioning solely as a platemaker, or can be incorporated directly into a lithographic printing press. In the latter case, printing may commence immediately after application of the image to a blank plate, thereby reducing press set-up time considerably. The imaging apparatus can be configured as a flatbed recorder or as a drum recorder, with the lithographic plate blank mounted to the interior or exterior cylindrical surface of the drum. Obviously, the exterior drum design is more appropriate to use in situ, on a lithographic press, in which case the print cylinder itself constitutes the drum component of the recorder or plotter.

In the drum configuration, the requisite relative motion between the laser beam and the plate is achieved by rotating the drum (and the plate mounted thereon) about its axis and moving the beam parallel to the rotation axis, thereby scanning the plate circumferentially so the image "grows" in the axial direction. Alternatively, the beam can move parallel to the drum axis and, after each pass across the plate, increment angularly so that the image on the plate "grows" circumferentially. In both cases, after a complete scan by the beam, an image corresponding (positively or negatively) to the original document or picture will have been applied to the surface of the plate.

In the flatbed configuration, the beam is drawn across either axis of the plate, and is indexed along the other axis after each pass. Of course, the requisite relative motion between the beam and the plate may be produced by movement of the plate rather than (or in addition to) movement of the beam. Examples of useful imaging devices include models of the TRENDSETTER imagesetters (available from Eastman Kodak Company) that utilize laser diodes emitting near-IR radiation at a wavelength of about 830 nm. Other suitable exposure units include the CRESCENT 42T Platesetter (operating at a wavelength of 1064 nm, available from Gerber Scientific, Chicago, Ill.) and the SCREEN PLATERITE 4300 series or 8600 series platesetter (available from Screen, Chicago, Ill.).

Regardless of the manner in which the beam is scanned, in an array-type system for on-press applications it is generally preferable to employ a plurality of lasers and guide their outputs to a single writing array. The writing array is then indexed, after completion of each pass across or along the plate, a distance determined by the number of beams emanating from the array, and by the desired resolution (i.e., the number of image points per unit length). Off-press applications, which can be designed to accommodate very rapid scanning (e.g., through use of high-speed motors, mirrors, etc.) and thereby utilize high laser pulse rates, can frequently utilize a single laser as an imaging source.

Figure 2B:
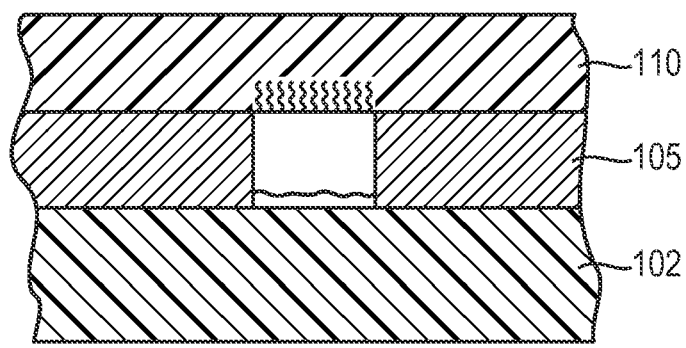
Figure 2C:
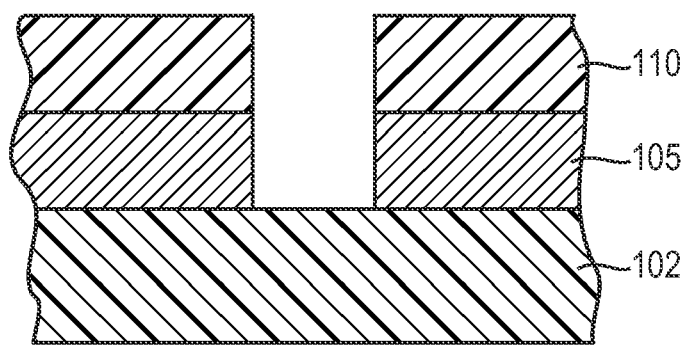

FIGS. 2A-2C show the consequences of imaging the printing member 100. As illustrated in FIG. 2B, the exposed area of the layer 105 absorbs the imaging pulse and converts it to heat. The heat builds up until the layer 105 ablates, i.e., undergoes either rapid phase transformation (e.g., vaporization) or catastrophic thermal overload. This process is mainly attributed to the contribution of an explosive mechanism generated in the image areas of the plate by exposure to laser radiation.

After imaging, the topmost layer 110 is degraded and/or de-anchored in the areas that received imaging radiation. The exposed areas that contain ablation debris are either purged of the debris prior to printing or during print "make ready." In some embodiments, the printing member can be used on press immediately after being imaged without the need for a post-imaging processing step. More typically, however, the de-anchored overlying layer and the central layer are removed (at least partially) by a post-imaging cleaning process—e.g., rubbing of the plate with or without a cleaning liquid—to reveal the third layer (typically an oleophilic polymer, such as polyester). In a preferred embodiment, the printing member is cleaned with a cleaning liquid that is aqueous in nature and free of organic solvent. For example, the cleaning liquid may consist essentially of water, e.g., plain tap water, and may be warmed to a temperature of 32-50° C. The cleaning liquid may be applied manually, using a cloth and/or brush, or mechanically using commercial plate-cleaning equipment. For example, many platemakers contain internal rotary scrub rollers that clean the plate following imaging.

Printing with the printing member includes disposing ink on at least a portion of the printing member, preferably the oleophilic exposed areas. The ink is transferred in the imagewise lithographic pattern (created as described above) to a recording medium such as paper. The inking and transferring steps may be repeated a desired number of times, e.g., the approximately 5,000 to approximately 50,000 times in a low to medium printing run.

EXAMPLES

Examples 1-3 and C1

These examples describe negative-working waterless printing plates that include a highly crosslinked silicone layer disposed above a thin titanium imaging layer that is itself disposed on a polyester substrate. A preferred substrate is a 175 μm white polyester film sold by DuPont-Teijin Films (Hopewell, Va.) under the name MELINEX 927W.

The imaging layer of the printing member is a thin titanium layer disposed on the polymer substrate by DC magnetron sputtering of a titanium target using ultrahigh purity argon as the sputtering gas. Prior to the metal deposition, the sputtering chamber is evacuated to base pressures below $3 \times 10^{-5}$ Torr and back-filled with argon up to a pressure of 5 mTorr. The sputtering process yields a layer of mixed metal/metal oxide composition with total thickness of 25 nm which, upon exposure to air, reacts with water molecules yielding a surface rich in hydroxyl functional groups. The latter act as the bonding sites for the adhesion of the polymer top-silicone layer of the plate structure.

The silicone layers used in the present invention may have a highly crosslinked network structure produced via the addition or hydrosilylation reaction between the vinyl groups (SiVi) of vinyl-terminated functional silicones and the silicon hydride groups of trimethylsiloxy-terminated poly(hydrogen methylsiloxane) crosslinker, in the presence of a Pt catalyst complex and an inhibitor.

The vinyl polymers employed in the following examples have a nominal chemical formula of $[CH_2=CH-Si(CH_3)_2-O-[\{Si(CH_3)_2-O\}_n-Si(CH_3)_2-CH=CH_2]$ with an average degree of polymerization, n, between 840 and 1580 and molecular weight ranging from 62,000 to 117,000 g/mol. The below table details the properties of a series of vinyl-terminated polydimethylsiloxanes (PDMS) manufactured by Gelest Inc. (Morrisville, Pa.) used in the ensuing examples. A higher-molecular-weight example is also included for comparative purposes.

| Product name | Molecular Weight (g/mol) | Viscosity (cps) | Density (g/l) | Weight % Vinyl |
|---|---|---|---|---|
| DMS-V41 | 62,700 | 10,000 | 0.97 | 0.08-0.12 |
| DMS-V42 | 72,000 | 20,000 | 0.98 | 0.07-0.09 |
| DMS-V46 | 117,000 | 60,000 | 0.98 | 0.04-0.06 |
| DMS-V52 | 155,000 | 165,000 | 0.98 | 0.03-0.04 |

Silicone formulations of the following composition, by weight, were prepared with each of the vinyl-functional PDMS examples listed in the previous table.

| Component | Parts |
|---|---|
| Vinyl Silicone | 12.40 |
| DC Syl Off 7367 Crosslinker | 0.53 |
| CPC 072 Pt Catalyst | 0.17 |
| Heptane | 86.9 |

The DC SYL OFF 7367 is a trimethylsiloxy-terminated poly(hydrogen methylsiloxane) crosslinker manufactured by Dow Corning Silicones (Midland, Mich.) which is supplied as a 100% solids solution containing about 30% 1-ethynylcyclohexane $[CH\equiv CH-CH(CH_2)_5]$, which functions as catalyst inhibitor. This crosslinker has a nominal formula of $[(CH_3)_3Si-O-\{SiH(CH_3)-O\}_m-Si(CH_3)_3]$ with degree of polymerization, m, between 30 to 32, and average molecular weight of about 2000 g/mol.

The CPC 072 is a 1,3 diethyenyl-1,1,3,3-tetramethyldisiloxane Pt complex catalyst manufactured by Umicore Precious Metals (South Plainfield, N.J.) which is supplied as a 3% xylene solution. The formulation solvent, heptane, is supplied by Houghton Chemicals (Allston, Mass.).

Silicone formulations were prepared by mixing of catalyst and vinyl PDMS in heptane, followed by addition of a heptane solution of the crosslinker. The formulations were applied to the metalized substrate with a wire-round rod, then dried and cured at 138° C. for one minute to produce uniform silicone coatings of 1.1 g/m².

The printing members of these examples were evaluated by two different methods to obtain information on the effect of the changes in silicone formulation on plate durability. First, plates were tested in the laboratory by assessing adhesion and solvent resistance with methyl ethyl ketone (MEK). A MEK resistance test is performed on pieces of the plate examples having lengths of about 20 cm by applying, in a reciprocating mode, MEK double-rubs using a five-pound load. The cycle is repeated to the point of visual evidence failure, i.e., marring of the surface or loss of silicone adhesion.

These plate examples were also imaged and run on-press to determine their press durability. The plates were imaged on a Presstek DIMENSION 425 plate setter at a power of 300 mJ/cm² and manually cleaned to remove the loosened silicone debris left on the plate after imaging. The cleaning involves a two-step procedure: first, a dry rubbing the surface with a dry cotton towel, and second, wet rubbing with a cotton towel saturated with isopropanol.

The press durability of the printing members was evaluated on a GTO Heidelberg press using black ink (Aqualess Ultra Black MZ waterless ink, Toyo Ink America LLC, Addison, Ill.) and uncoated stock (Williamsburg Plus Offset Smooth, 60 lb white, item number: 05327, International Paper, Memphis, Tenn.). The plates were run until signs of background wear were observed on the printing sheets. The number of print sheets at which background wear starts to appear is reported as the press durability of these printing members under the described printing conditions.

The following table shows the results of the laboratory and press evaluation of different printing plate examples.

| Example | Vi-PDMS Molecular Weight (g/mol) | SiH:SiVi | MEK Rubs | Press Durability |
|---|---|---|---|---|
| Example 1 | 62,700 | 13.3:1 | 15-20-25 | 5000 to 6000 |
| Example 2 | 72,000 | 15.2:1 | 20-25-30 | 5000 to 6000 |
| Example 3 | 117,000 | 24.7:1 | 15-20-25 | 5000 to 6000 |
| Example C1 | 155,000 | 32.8:1 | 5-10 | 3000 |

Both the MEK solvent resistance and press testing demonstrate that printing members made with vinyl-functional PDMS resins of molecular weight from 62,700 to 117,000 g/mol and having high SiH:SiVi ratios between 13:1 and 25:1 display at least twice the durability of the comparative example made with a high-molecular-weight vinyl silicone.

Examples 4-6 and C2

Printing members similar to those described in Examples 1-3 were made with a thicker silicone top layers to create more durable printing members. In these examples, the same formulations were applied to the metalized substrate with a wire-round rod, then dried and cured at 138° C. for one minute to produce coatings of 2.0 g/m².

The printing members were imaged, cleaned, and tested as described in Examples 1-3. The performance of these examples is summarized in the following table:

| Example | Vi-PDMS Molecular weight (g/mol) | Formulation SiH:SiVi | MEK Rubs | Press Durability |
|---|---|---|---|---|
| Example 4 | 62,700 | 13.3:1 | 30-35 | 12,000 to 14,000 |
| Example 5 | 72,000 | 15.2:1 | 30-35 | 13,000 to 15,000 |
| Example 6 | 117,000 | 24.7:1 | 30-35 | 15,000 to 16,000 |
| Example C2 | 155,000 | 32.8:1 | 10-15 | 8000 |

Consistent with the results obtained in the previous examples, the results show that printing members made with the intermediate-molecular-weight silicone resin exhibit improved durability, which is at least twice that of the comparative Example C2 made with the same silicone layer thickness. Furthermore, doubling the coating weight leads to at least a two-fold increase in durability compared to the above examples made with the 1.1 g/m² silicone layer.

Examples 7 and C3-C5

Silicone formulations of the following composition, by weight, were made with the vinyl-functional PDMS formulations described above. These examples contain about half the concentration of the crosslinker used in Examples 1-3.

| Component | Parts |
|---|---|
| Vinyl Silicone | 12.40 |
| DC Syl Off 7367 Crosslinker | 0.27 |
| CPC 072 Pt Catalyst | 0.17 |
| Heptane | 87.16 |

The formulations were applied to the metalized substrate with a wire-round rod, then dried and cured at 138° C. for one minute to produce coatings of about 1.1 g/m².

| Example | Vi-PDMS Molecular weight (g/mol) | Formulation SiH:SiVi | MEK Rubs |
|---|---|---|---|
| Example C3 | 62,700 | 6.6:1 | 5-10 |
| Example C4 | 72,000 | 7.6:1 | 5-10 |
| Example 7 | 117,000 | 12.4:1 | 15-20 |
| Example C5 | 155,000 | 16.4:1 | 5-10 |

The reduction of the crosslinker concentration leads to considerable loss of solvent resistance by the printing members of Examples C3 and C4 made with the lower-molecular-weight resins (compared to Examples 1 and 2). The change may be attributed to the reduction of crosslinker molecules available for crosslinking and bonding to the metal surface. Note that these two formulations have a much lower SiH:SiVi ratio than that used in the earlier examples.

The decrease in crosslinker density has slight or no effect on the solvent resistance of Example 7 (compared to Example 3) made with the higher-molecular-weight resin. The formulation of Example 7 has a relatively high (>10:1) SiH:SiVi ratio, which appears sufficient to achieve formation of a highly crosslinked silicone network and provide adhesion to the metal substrate.

Examples 8 and C6-C8

Silicone formulations of the following composition, by weight, were prepared with each of the vinyl-functional PDMS formulations described above. These examples contain one-fourth the concentration of the crosslinker used in Examples 1-3.

| Component | Parts |
|---|---|
| Vinyl Silicone | 12.40 |
| DC Syl Off 7367 Crosslinker | 0.13 |
| CPC 072 Pt Catalyst | 0.17 |
| Heptane | 87.30 |

| Example | Vi-PDMS Molecular weight (g/mol) | Formulation SiH:SiVi | MEK Rubs |
|---|---|---|---|
| Example C6 | 62,700 | 3.3:1 | 0-5 |
| Example C7 | 72,000 | 3.8:1 | 0-5 |
| Example 8 | 117,000 | 6.2:1 | 15-20 |
| Example C8 | 155,000 | 8.2:1 | 10-15 |

Comparative Examples C6 and C7 present very low solvent resistance. This is consistent with the observations made regarding Examples C3 and C4, and shows that further reduction of SiH:SiVi ratio to values lower than six causes complete loss of the MEK resistance of these silicone coatings. An important observation is that Example 8, made with the 117,000 g/mol vinyl PDMS, still displays good solvent resistance. Note that Example 8 has relatively high (>6:1) SiH:SiVi ratio.

Examples C9-C12

Silicone formulations of the following composition, by weight, are prepared with each of the vinyl-functional PDMS described above. These examples contain twice the concentration of the crosslinker used of Examples 1-3.

| Component | Parts |
|---|---|
| Vinyl Silicone | 12.40 |
| DC Syl Off 7367 Crosslinker | 1.07 |
| CPC 072 Pt Catalyst | 0.17 |
| Heptane | 86.36 |

The formulations were applied to the metalized substrate with a wire-round rod, then dried and cured at 138° C. for one minute to produce coatings of 1.1 g/m².

| Example | Vi-PDMS Molecular weight (g/mol) | Formulation SiH:SiVi | MEK Rubs |
|---|---|---|---|
| Example C9 | 62,700 | 26.5:1 | 0-5 |
| Example C10 | 72,000 | 30.4:1 | 0-5 |
| Example C11 | 117,000 | 49.4:1 | 0-5 |
| Example C12 | 155,000 | 65.5:1 | 0-5 |

These comparative examples show that an excess of crosslinking molecules causes complete loss of the solvent resistance of the printing members made with the intermediate-molecular-weight PDMS resins. The formulations of these four examples would lead to the formation of silicone coatings with large amounts of loose residual crosslinker.

It will be seen that the foregoing techniques provide a basis for improved lithographic printing and superior plate constructions. The terms and expressions employed herein are used as terms of description and not of limitation, and there is no intention in the use of such terms and expressions of excluding any equivalents of the features shown and described or portions thereof. Instead, it is recognized that various modifications are possible within the scope of the invention claimed.

What is claimed is:

1. A recording medium comprising an oleophilic substrate and, thereover, a topmost oleophobic layer comprising a cured polymeric silicone matrix that consists essentially of the addition-cure reaction product of a vinyl-functional polydialkylsiloxane and a silane cross-linking agent, and further comprising a laser-ablatable imaging layer between the substrate and the topmost layer, wherein:
   a) the vinyl-functional polydialkylsiloxane has a molecular weight ranging from 30,000 to 75,000 or 110,000 to 130,000;
   b) if the molecular weight of the vinyl-functional polydialkylsiloxane is within the range of 30,000 to 75,000, a molar ratio of silane groups in the cross-linking agent to vinyl groups in the polydialkylsiloxane is within the range of about 11:1 to about 25:1; and
   c) if the molecular weight of the vinyl-functional polydialkylsiloxane is within the range of 110,000 to 130,000, the molar ratio of silane groups in the cross-linking agent to vinyl groups in the polydialkylsiloxane is from about 5:1 to about 27:1
   and further wherein the imaging layer (i) has a thickness no greater than 50 nm, (ii) is a thin metal/metal oxide layer and (iii) is ablatable upon exposure to a laser beam having a fluence of at least 250 mJ/cm$^2$.

2. The recording medium of claim 1, wherein the vinyl-functional polydialkylsiloxane is vinyl-functional polydimethylsiloxane.

3. The recording medium of claim 1, wherein the vinyl-functional polydialkylsiloxane has a molecular weight ranging from 30,000 to 65,000.

4. The recording medium of claim 1, wherein the vinyl-functional polydialkylsiloxane has a molecular weight ranging from 110,000 to 130,000 and the molar ratio of silane groups in the cross-linking agent to vinyl groups in the polydialkylsiloxane is from about 20:1 to 27:1.

5. The recording medium of claim 1, wherein the silane cross-linking agent is a trimethylsiloxy-terminated polymethylhydrosiloxane.

6. The recording medium of claim 1, wherein the topmost oleophobic layer has a dry coat weight of 2 g/m$^2$.

7. The recording medium of claim 1, wherein the substrate comprises a polyester film.

8. The recording medium of claim 1, wherein the substrate comprises a metal sheet having an oleophilic coating thereover.

* * * * *